US012729214B2

(12) United States Patent
Saga

(10) Patent No.: US 12,729,214 B2
(45) **Date of Patent: *Sep. 8, 2026**

(54) METHOD OF PRODUCING ALKENYL PHOSPHORUS COMPOUND

(71) Applicant: MARUZEN PETROCHEMICAL CO., LTD., Tokyo (JP)

(72) Inventor: Yuta Saga, Ichihara (JP)

(73) Assignee: Maruzen Petrochemical Co., LTD., Tokyo (JP)

(*) Notice: Subject to any disclaimer, the term of this patent is extended or adjusted under 35 U.S.C. 154(b) by 584 days.

This patent is subject to a terminal disclaimer.

(21) Appl. No.: 18/257,897

(22) PCT Filed: Feb. 8, 2022

(86) PCT No.: PCT/JP2022/004800

§ 371 (c)(1),
(2) Date: Jun. 16, 2023

(87) PCT Pub. No.: WO2022/172905

PCT Pub. Date: Aug. 18, 2022

(65) Prior Publication Data

US 2024/0059718 A1 Feb. 22, 2024

(30) Foreign Application Priority Data

Feb. 9, 2021 (JP) ................................ 2021-019308

(51) Int. Cl.
*C07F 9/40* (2006.01)
*B01J 23/755* (2006.01)

(52) U.S. Cl.
CPC ........... *C07F 9/4015* (2013.01); *B01J 23/755* (2013.01)

(58) Field of Classification Search
CPC ............................ C07F 9/4015; C07F 9/5316
See application file for complete search history.

(56) References Cited

U.S. PATENT DOCUMENTS

| | | | |
|---|---|---|---|
| 3,681,481 | A | 8/1972 | Lin |
| 6,111,127 | A | 8/2000 | Tanaka et al. |
| 10,479,809 | B2 | 11/2019 | Kinami et al. |

FOREIGN PATENT DOCUMENTS

| | | | |
|---|---|---|---|
| CN | 107949564 | A | 4/2018 |
| EP | 3 348 561 | A1 | 7/2018 |
| JP | 2000-256380 | A | 9/2000 |
| JP | 2005-232067 | A | 9/2005 |
| JP | 5388856 | B2 | 1/2014 |
| WO | 2009/051025 | A1 | 4/2009 |
| WO | 2017/043552 | A1 | 3/2017 |

OTHER PUBLICATIONS

English translation of the International Preliminary Report on Patentability (Chapter I) dated Aug. 24, 2023 (Application No. PCT/JP2022/004800).

Chinese Office Action (with English translation) dated Nov. 11, 2024 (Application No. 202280006390.6).

Reznikoc A. N. et al., "*Catalytic Addition of O-Methyl (Adamant-2-ylmethyl)phosphonite to Phenylacetylene*," Russian Journal of General Chemistry, Pleiad Es Publishing, Moscow, vol. 84, No. 9, Oct. 12, 2024 (Oct. 12, 2014) pp. 1737-1741.

Extended European Search Report dated Jan. 17, 2025 (Application No. 22752728.0).

Japanese Office Action (with English translation) dated Dec. 24, 2024 (Application No. 2022-580626).

Chinese Office Action (with English translation) dated Mar. 3, 2025 (Application No. 202280006390.6).

Li-Biao Han et al., "Efficient and Selective Nickel-Catalyzed Addition of H—P(O) and H—S Bonds to Alkynes," Journal of American Chemical Society, 2004, vol. 126, pp. 5080-5081 (2 pages).

International Search Report and Written Opinion (Application No. PCT/JP2022/004800) dated Apr. 19, 2022.

*Primary Examiner* — Sikarl A Witherspoon
(74) *Attorney, Agent, or Firm* — Muncy, Geissler, Olds & Lowe, P.C.

(57) ABSTRACT

[Problem to be Solved] An object of the present invention is to provide a method of producing an alkenyl phosphorus compound.

[Solution to Problem] The method of producing an alkenyl phosphorus compound according to the present invention is a method of allowing a specific phosphorus compound to react with a specific alkynyl compound in the presence of a transition metal complex, a Lewis acid and a low-polarity additive, to produce a specific alkenyl phosphorus compound.

12 Claims, No Drawings

METHOD OF PRODUCING ALKENYL PHOSPHORUS COMPOUND

BACKGROUND OF THE INVENTION

Field of the Invention

The present invention relates to a method of producing an alkenyl phosphorus compound. More particularly, the present invention relates to a method of producing an alkenyl phosphorus compound by a hydrophosphorylation reaction, in the presence of a transition metal complex, a Lewis acid and a low-polarity additive.

Background Art

Organic phosphorus compounds are chemical substances widely used in a variety of products, such as flame retardants, plasticizers, insecticides, pharmaceutical and agricultural chemicals, ligands for metal complexes and the like. In recent years, organic phosphorus compounds are particularly attracting industrial attention as functional materials, also in the fields of constituent materials for metal surface treatment agents, flame retardant resins and the like, and electronic materials.

Since phosphonic acid derivatives, among organic phosphorus compounds, are useful precursor substances of a variety of chemical substances described above, various production methods thereof have been conventionally investigated. For example, the production of a phosphonic acid derivative by the addition reaction (hereinafter, referred to as "hydrophosphorylation reaction") of the P(O)—H bond of phosphonic acid to an alkyne, using a catalyst, has been performed. For example, Patent Document 1 proposes a technique of producing a phosphonic acid derivative in which a phosphonic acid diester compound that has been partially hydrolyzed in advance, is used as a raw material. Further, Non-patent Document 1 proposes a technique of producing a phosphonic acid derivative using any of various zero-valent nickel catalysts.

CITATION LIST

Patent Document

Patent Document 1: WO 2017/043552

Non-Patent Document

Non-patent Document 1: J. AM. CHEM. SOC. 2004, 126, 5080 to 5081

SUMMARY OF THE INVENTION

Technical Problem

However, there have been problems in the reaction conditions disclosed in Patent Document 1, such as that a hydrolysis reaction as a pretreatment needs to be performed, making it necessary to perform one additional step, and that a large amount of reaction heat is generated while requiring a low reaction temperature, making it difficult to perform temperature control in order to achieve mass production. In addition, catalysts to be used in the hydrophosphorylation reaction are expensive, unstable and ignitable, and have a bad odor, and thus, a safe and inexpensive catalyst has been demanded. On the other hand, Non-patent Document 1 discloses a technique of carrying out a hydrophosphorylation reaction with a nickel complex using inexpensive triphenylphosphine. However, this results in a low reactivity, and a phosphonic acid derivative can be obtained only at a low yield even if a large amount of catalyst is used. Moreover, many of phosphine compounds and nickel compounds are difficult to obtain industrially, leading to another problem that the range for the selection of raw materials is narrow.

Therefore, an object of the present invention is to provide a method of producing an alkenyl phosphorus compound, which method is capable of controlling a catalyst in the reaction system to allow a hydrophosphorylation reaction to proceed efficiently at room temperature or at room temperature with slight heating, using a divalent nickel compound which is easily available as an industrial raw material, stable in air and inexpensive, and a phosphine having an aromatic substituent which is stable in air and inexpensive.

Solution to Problem

The present inventors have found out, as a result of intensive studies to solve the above-mentioned problems, that it is possible to produce an alkenyl phosphorus compound efficiently, by carrying out the hydrophosphorylation reaction of a specific phosphorus compound with a specific alkynyl compound, in the presence of a transition metal complex, a Lewis acid and a low-polarity additive, thereby completing the present invention.

Specifically, the present invention provides the following inventions.

[1] A method of producing an alkenyl phosphorus compound represented by the general formula (4) shown below, comprising allowing a phosphorus compound represented by the following general formula (1):

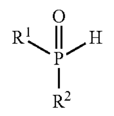

(1)

(wherein, in general formula (1), each of $R^1$ and $R^2$ independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group; wherein $R^1$ and $R^2$ may be bonded with each other to form a cyclic structure)

to react with an alkynyl compound represented by the following general formula (2):

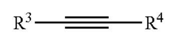

(2)

(wherein, in general formula (2), each of $R^3$ and $R^4$ independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heteroaryl group, a substituted or unsubstituted alkenyl group, a substituted or unsubstituted alkoxy group, a substituted or unsubstituted aryloxy group, or a substituted or unsubstituted silyl group)

in the presence of a transition metal complex, a Lewis acid and a low-polarity additive, to produce the alkenyl phosphorus compound represented by the general formula (4):

(4)

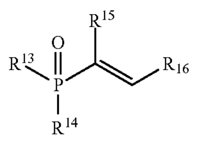

(wherein, in general formula (4), the definitions of $R^{13}$ and $R^{14}$ are the same as those of $R^1$ and $R^2$ in the general formula (1), and the definitions of $R^{15}$ and $R^{16}$ are the same as those of $R^3$ and $R^4$ in the general formula (2)).

[2] The production method according to [1], wherein the transition metal complex is a nickel complex.

[3] The production method according to [2], wherein the transition metal complex is a zero-valent nickel complex of nickel and a phosphine.

[4] The production method according to [3], wherein the phosphine is a phosphine containing an aromatic substituent.

[5] The production method according to any one of [1] to [4], wherein the Lewis acid is a metal compound.

[6] The production method according to [5], wherein the metal compound is at least one selected from the group consisting of zinc chloride, zinc bromide and iron (II) chloride.

[7] The production method according to any one of [1] to [6], wherein each of $R^1$ and $R^2$ in the general formula (1) independently represents a substituted or unsubstituted alkoxy group having from 1 to 10 carbon atoms, or a substituted or unsubstituted aryl group; and each of $R^{13}$ and $R^{14}$ in the general formula (4) independently represents a substituted or unsubstituted alkoxy group having from 1 to 10 carbon atoms, or a substituted or unsubstituted aryl group.

[8] The production method according to any one of [1] to [7], wherein both of $R^3$ and $R^4$ in the general formula (2) are hydrogen atoms, and both of $R^{15}$ and $R^{16}$ in the general formula (4) are hydrogen atoms.

[9] The production method according to any one of [1] to [8], wherein the reaction is carried out at a temperature of from 10 to 60° C.

[10] The production method according to any one of [1] to [9], wherein the low-polarity additive is at least one selected from the group consisting of an aromatic hydrocarbon, an aliphatic hydrocarbon and an alicyclic hydrocarbon.

[11] The production method according to any one of [1] to [10], wherein the low-polarity additive is at least one selected from the group consisting of toluene, tetralin and methylnaphthalene.

[12] The production method according to any one of [1] to [11], wherein the amount of the low-polarity additive added is 1% by mass or more and 70% by mass or less with respect to the total amount of the reaction system other than the alkynyl compound.

[13] The production method according to any one of [1] to [12], wherein the rate of generation of a by-product is 10% or less.

Advantageous Effects of Invention

According to the present invention, it is possible to produce an alkenyl phosphorus compound efficiently, by carrying out the hydrophosphorylation reaction of a specific phosphorus compound with a specific alkynyl compound, in the presence of a transition metal complex, a Lewis acid and a low-polarity additive. Further, according to the present invention, it is possible to reduce the amount to be used of the transition metal complex, which is a catalyst, and also to improve the yield of the alkenyl phosphorus compound while achieving a high reaction selectivity and reducing the generation of a by-product.

DETAILED DESCRIPTION OF THE INVENTION

[Method of Producing Alkenyl Phosphorus Compound]

(Hydrophosphorylation Reaction)

The method of producing an alkenyl phosphorus compound according to the present invention is a method of producing an alkenyl phosphorus compound, by carrying out the hydrophosphorylation reaction of a phosphorus compound and an alkynyl compound, which are raw material substances, in the presence of a transition metal complex as a catalyst, a Lewis acid and a low-polarity additive. The method of producing an alkenyl phosphorus compound according to the present invention enables to reduce the amount to be used of the transition metal complex, which is a catalyst, and also to improve the yield of the alkenyl phosphorus compound while achieving a high reaction selectivity and reducing the generation of a by-product.

(Phosphorus Compound)

As a raw material substance for the hydrophosphorylation reaction, it is possible to use a phosphorus compound represented by the following general formula (1):

(1)

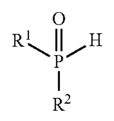

(wherein, in general formula (1), each of $R^1$ and $R^2$ independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group; wherein $R^1$ and $R^2$ may be bonded with each other to form a cyclic structure).

In the general formula (1), the number of carbon atoms of the alkyl group, the alkoxy group, the cycloalkyl group, the aralkyl group, the aryl group or the aryloxy group represented by each of $R^1$ and $R^2$ is preferably from 1 to 10. The number of carbon atoms described above does not include the number of carbon atoms of a substituent. Examples of the group represented by each of $R^1$ and $R^2$ include: alkyl groups such as methyl group, ethyl group, propyl group, isopropyl group, n-butyl group, isobutyl group, sec-butyl group, pentyl group and hexyl group; alkoxy groups such as methoxy group, ethoxy group and butoxy group; cycloalkyl groups such as cyclohexyl group; aralkyl groups such as benzyl group and phenethyl group; aryl groups such as phenyl group, tolyl group, xylyl group and naphthyl group;

and aryloxy groups such as phenoxy group. Among these groups, it is preferred that each of $R^1$ and $R^2$ independently be a substituted or unsubstituted alkoxy group.

The substituent which may be included in each of $R^1$ and $R^2$ in the general formula (1) may be, for example, an alkyl group, a cycloalkyl group, an alkoxy group, a cycloalkoxy group, a heterocyclic group, an alkylidene group, a silyl group, an acyl group, an acyloxy group, a carboxy group, a cyano group, a nitro group, a hydroxy group, a mercapto group and an oxo group. Further, the number of carbon atoms contained in the substituent is preferably from 1 to 6, more preferably from 1 to 4, and still more preferably from 1 to 3.

(Alkynyl Compound)

As a raw material substance for the hydrophosphorylation reaction, it is possible to use an alkynyl compound represented by the following general formula (2):

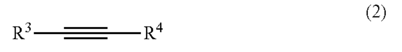

(2)

(wherein, in general formula (2), each of $R^3$ and $R^4$ independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heteroaryl group, a substituted or unsubstituted alkenyl group, a substituted or unsubstituted alkoxy group, a substituted or unsubstituted aryloxy group, or a substituted or unsubstituted silyl group).

In the general formula (2), the number of carbon atoms of the alkyl group, the cycloalkyl group, the aralkyl group, the aryl group, the heteroaryl group, the alkenyl group, the alkoxy group or the aryloxy group represented by each of $R^3$ and $R^4$ is preferably from 1 to 10. The number of carbon atoms described above does not include the number of carbon atoms of a substituent. Examples of the group represented by each of $R^3$ and $R^4$ include: alkyl groups such as methyl group, ethyl group, propyl group, isopropyl group, n-butyl group, isobutyl group, sec-butyl group, pentyl group and hexyl group; cycloalkyl groups such as cyclohexyl group; aralkyl groups such as benzyl group and phenethyl group; aryl groups such as phenyl group, tolyl group, xylyl group and naphthyl group; alkenyl groups such as 1-butenyl group, 2-butenyl group, 1,3-butadienyl group, pentenyl group and hexenyl group; alkoxy groups such as such as methoxy group, ethoxy group and butoxy group; and aryloxy groups such as phenoxy group. Among these groups, it is preferred that each of $R^3$ and $R^4$ independently be a substituted or unsubstituted alkyl group having from 1 to 10 carbon atoms, a substituted or unsubstituted aryl group, or a substituted or unsubstituted aralkyl group.

The substituent which may be included in each of $R^3$ and $R^4$ in the general formula (2) may be, for example, an alkyl group, a cycloalkyl group, an alkoxy group, a cycloalkoxy group, a heterocyclic group, an alkylidene group, a silyl group, an acyl group, an acyloxy group, a carboxy group, a cyano group, a nitro group, a hydroxy group, a mercapto group and an oxo group. Further, the number of carbon atoms contained in the substituent is preferably from 1 to 6, more preferably from 1 to 4, and still more preferably from 1 to 3.

Both of $R^3$ and $R^4$ in the general formula (2) may be hydrogen atoms. In other words, the alkynyl compound may be acetylene. The use of acetylene allows the hydrophosphorylation reaction to efficiently proceed at room temperature or at room temperature with slight heating, to improve the yield of the alkenyl phosphorus compound.

The ratio of the amount of substance of the phosphorus compound represented by the general formula (1) and the alkynyl compound represented by the general formula (2), which are the raw material substances for the hydrophosphorylation reaction, is preferably from 10:1 to 0.1:1, more preferably from 3:1 to 0.7:1, and still more preferably from 1.1:1 to 0.9:1.

(Transition Metal Complex (Catalyst))

A transition metal complex can be used as the catalyst to be used in the hydrophosphorylation reaction. The transition metal complex may be, for example, a nickel complex, and is preferably a zero-valent nickel complex.

The nickel complex described above is preferably a nickel complex of nickel and a phosphine. The phosphine is preferably a phosphine containing an aromatic substituent. Examples of the phosphine containing an aromatic substituent include triphenylphosphine, 1,2-bis(diphenylphosphino)ethane, 1,3-bis(diphenylphosphino)propane, 1,4-bis(diphenylphosphino)butane, diphenyl methylphosphine, tris(2-methylphenyl)phosphine, tris(3-methylphenyl)phosphine, tris(4-methylphenyl)phosphine and tris(4-methoxyphenyl)phosphine. Since the phosphine containing an aromatic substituent is inexpensive and can be easily handled in air, it is possible to reduce the production cost and to improve the production efficiency.

(Lewis Acid)

A metal compound can be used as the Lewis acid to be used in the hydrophosphorylation reaction. The metal compound may be, for example, zinc chloride, zinc bromide, iron (II) chloride or the like. The addition of the Lewis acid when carrying out the hydrophosphorylation reaction allows the catalytic activity to appear in the vicinity of room temperature, making it possible to improve the reaction velocity and to enhance the conversion rate of the raw material phosphorus compound to the alkenyl phosphorus compound.

(Low-Polarity Additive)

The low-polarity additive to be used in the hydrophosphorylation reaction may be, for example, an aromatic hydrocarbon, an aliphatic hydrocarbon, an alicyclic hydrocarbon or the like. Examples of the aromatic hydrocarbon include toluene, tetralin, methylnaphthalene, xylene, ethylbenzene, styrene, naphthalene and indene. Examples of the aliphatic hydrocarbon include n-hexane, n-heptane, isooctane and n-decane. Examples of the alicyclic hydrocarbon include cyclopentane, cyclopentadiene, cyclohexane, methylcyclohexane, cyclohexene, dicyclopentadiene, decalin and norbornane. Among these hydrocarbons, an aromatic hydrocarbon is preferred, and toluene, tetralin and methylnaphthalene are particularly preferred. These low-polarity additives may be used singly, or in combination of two or more kinds thereof. The use of such a low-polarity additive in the hydrophosphorylation reaction enables to reduce the amount to be used of the transition metal complex, which is a catalyst, and also to improve the yield of the alkenyl phosphorus compound while achieving a high reaction selectivity and reducing the generation of a by-product.

(Reaction Conditions)

The amount of the transition metal complex (catalyst) to be used in the hydrophosphorylation reaction is not particularly limited as long as the reaction proceeds sufficiently. However, the amount of the transition metal complex used is preferably from 0.01 to 10 mol, more preferably from 0.1 to 5.0 mol, and still more preferably from 0.3 to 1.0 mol, with respect to 1 mol of the phosphorus compound as a raw material substance.

The amount of the Lewis acid to be used in the hydrophosphorylation reaction is not particularly limited as long as the reaction proceeds sufficiently. However, the amount of the Lewis acid used is preferably from 1 to 30 mol, more preferably from 2 to 10 mol, and still more preferably from 3 to 5 mol, with respect to 1 mol of the transition metal complex. When the amount of the Lewis acid to be used is within the range described above, the activity of the catalyst in the hydrophosphorylation reaction is increased to result in a significant improvement in the reaction velocity, making it possible to enhance the conversion rate of the raw material phosphorus compound to the alkenyl phosphorus compound.

The amount of the low-polarity additive to be used in the hydrophosphorylation reaction is not particularly limited as long as the reaction proceeds sufficiently. However, the amount of the low-polarity additive used is preferably from 1 to 70% by mass, more preferably from 5 to 50% by mass, still more preferably from 7.5 to 40% by mass, and yet still more preferably from 8 to 30% by mass, with respect to the total amount of the reaction system (reaction liquid of the mixture) other than the alkynyl compound. When the amount of the low-polarity additive to be used is within the range described above, it is possible to reduce the amount to be used of the transition metal complex, which is a catalyst, and also to improve the yield of the alkenyl phosphorus compound while achieving a high reaction selectivity and reducing the generation of a by-product.

The reaction temperature of the hydrophosphorylation reaction is not particularly limited. In view of improving the reaction efficiency and the reaction velocity, and reducing the generation of a by-product, however, the reaction temperature is preferably from 10 to 60° C., more preferably from 15 to 50° C., and still more preferably 20 to 35° C. When the reaction temperature is within the range described above, it is possible to improve the reaction velocity of the hydrophosphorylation reaction, and to enhance the conversion rate of the raw material phosphorus compound to the alkenyl phosphorus compound.

The reaction time of the hydrophosphorylation reaction is not particularly limited. In view of improving the reaction efficiency and the reaction velocity, and reducing the generation of a by-product, however, the reaction time is preferably from 30 minutes to 1,000 minutes, more preferably from 60 minutes to 900 minutes, and still more preferably from 120 minutes to 800 minutes. When the reaction time is within the range described above, it is possible to allow the hydrophosphorylation reaction to proceed sufficiently, and to enhance the conversion rate of the raw material phosphorus compound to the alkenyl phosphorus compound.

The hydrophosphorylation reaction may be carried out either in an organic solvent or in the absence of a solvent, but is preferably carried out in the absence of a solvent. The hydrophosphorylation reaction can be allowed to proceed, by using the non-solvent method and performing a mild heating. It is possible to omit the solvent removal process after the completion of the reaction and to reduce the production cost, by carrying out the reaction in the absence of a solvent. The organic solvent is not particularly limited, and may be, for example, an alcohol, an ether, a ketone, an ester or the like.

The hydrophosphorylation reaction is preferably carried out in an inert gas atmosphere, in view of improving the reaction efficiency and the reaction velocity, and reducing the generation of a by-product. It is preferred that nitrogen, argon or the like be used as the inert gas.

The conversion rate from the phosphorus compound to the alkenyl phosphorus compound in the hydrophosphorylation reaction is preferably 60% or more, more preferably 70% or more, and still more preferably 75% or more, and yet still more preferably 80% or more. The "conversion rate (%)" in the present invention can be determined by calculating the proportion of the raw material phosphorus compound decreased by the end of the reaction with respect to the amount of substance of the raw material phosphorus compound at the start of the reaction. The conversion rate of the reaction as used herein can be measured by identifying the respective components by GC-FID. When the conversion rate from the phosphorus compound to the alkenyl phosphorus compound is equal to or higher than the numerical value described above, it is possible to achieve an efficient raw material utilization, a reduction in the production cost, and an improvement in the production efficiency.

The selectivity from the phosphorus compound to the alkenyl phosphorus compound in the hydrophosphorylation reaction is preferably 65% or more, more preferably 70% or more, and still more preferably 75% or more. The "selectivity (%)" in the present invention can be determined by calculating the proportion of the raw material phosphorus compound that has been produced as the alkenyl phosphorus compound of interest, in the raw material phosphorus compound that has been consumed in the reaction. The selectivity of the reaction as used herein can be measured by identifying the respective components by GC-FID. When the selectivity from the phosphorus compound to the alkenyl phosphorus compound is equal to or higher than the numerical value described above, it is possible to achieve an efficient raw material utilization, a reduction in the production cost, a reduction in the amount of waste after the production, and an improvement in the production efficiency.

The yield of the alkenyl phosphorus compound from the phosphorus compound in the hydrophosphorylation reaction is preferably 60% or more, and more preferably 65% or more. The "yield (%)" in the present invention can be determined by calculating the ratio of the alkenyl phosphorus compound that has actually been produced, with respect to the theoretical yield of the alkenyl phosphorus compound calculated from the amount of substance of the raw material phosphorus compound used in the reaction. The yield of the reaction as used herein can be measured by identifying the respective components by GC-FID. When the yield of the alkenyl phosphorus compound from the phosphorus compound is equal to or higher than the numerical value described above, it is possible to achieve an efficient raw material utilization, a reduction in the production cost, a reduction in the amount of waste after the production, and an improvement in the production efficiency.

The rate of generation of a by-product in the hydrophosphorylation reaction is preferably 10% or less, more preferably 5% or less, and still more preferably 3% or less. The "by-product" as used herein refers to a hexatrienyl compound represented by the following general formula (3), generated by the reaction of the raw material phosphorus compound with 3 equivalents of the alkynyl compound. When the rate of generation of the by-product is equal to or less than the numerical value described above, it is possible to achieve an efficient raw material utilization, a reduction in the production cost, and an improvement in the production efficiency.

(3)

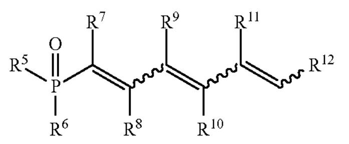

(In general formula (3), the definitions of $R^5$ and $R^6$ are the same as those of $R^1$ and $R^2$ in the general formula (1), and the definitions of $R^7$ to $R^{12}$ are the same as those of $R^3$ and $R^4$ in the general formula (2).)

Preferred embodiments of $R^5$ and $R^6$ are the same as the preferred embodiments of $R^1$ and $R^2$ described above. Further, preferred embodiments of $R^7$ to $R^{12}$ are the same as the preferred embodiments of $R^3$ and $R^4$ described above.

(Alkenyl Phosphorus Compound)

In the present invention, an alkenyl phosphorus compound represented by the following general formula (4) can be obtained by a hydrophosphorylation reaction.

(4)

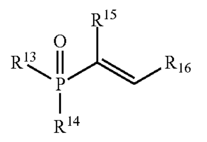

(In general formula (4), the definitions of $R^{13}$ and $R^{14}$ are the same as those of $R^1$ and $R^2$ in the general formula (1), and the definitions of $R^{15}$ and $R^{16}$ are the same as those of $R^3$ and $R^4$ in the general formula (2)).

Preferred embodiments of $R^{13}$ and $R^{14}$ are the same as the preferred embodiments of $R^1$ and $R^2$ described above. Further, preferred embodiments of $R^{15}$ and $R^{16}$ are the same as the preferred embodiments of $R^3$ and $R^4$ described above.

EXAMPLES

The present invention will now be described in specific detail with reference to Examples and Comparative Examples. However, the present invention is in no way limited to these Examples.

<Synthesis of Alkenyl Phosphorus Compound>

Example 1

Into a 1 L three-neck flask, 3.71 g of nickel chloride, 2.18 g of zinc and 30.3 g of triphenylphosphine were weighed and introduced, and the interior of the flask was replaced with nitrogen. A quantity of 42.0 g of toluene was added thereto, and the flask was stirred and heated at 95° C. for 6 hours, to obtain a mixture of a nickel complex and a low-polarity additive.

Subsequently, 21.0 g of zinc chloride, and the entire amount of the above-obtained mixture of the nickel complex as a catalyst and the low-polarity additive, were added to 420 g of dimethyl phosphite, and then an acetylene gas was blown into the resulting mixture. As a result, the reaction temperature varied within the range of from 25 to 28° C., and 3.19 mol of the acetylene gas was absorbed over 660 minutes, to give dimethyl vinylphosphonate. The reaction gave a conversion rate of 79.9%, a selectivity of 80.7%, and a yield of 64.4%. The conversion rate, the selectivity and the yield of the reaction were measured by identifying the respective components by GC-FID. The generation of dimethyl 1,3,5-hexatrienylphosphonate as a by-product was not observed.

Example 2

The same procedure as in Example 1 was carried out except that 4.95 g of nickel chloride, 2.91 g of zinc and 40.4 g of triphenylphosphine were used. As a result, the reaction temperature varied within the range of from 25 to 27° C., and 3.72 mol of the acetylene gas was absorbed over 660 minutes, to give dimethyl vinylphosphonate. The reaction gave a conversion rate of 90.8%, a selectivity of 76.3%, and a yield of 69.3%. Further, dimethyl 1,3,5-hexatrienylphosphonate as a by-product had been generated, and the reaction liquid contained 2.4% by mass of the compound.

Example 3

The same procedure as in Example 2 was carried out except that the amount of toluene used was changed to 200.0 g. A quantity of 3.61 mol of the acetylene gas was absorbed, to give dimethyl vinylphosphonate. The reaction gave a conversion rate of 79.6%, a selectivity of 77.5%, and a yield of 61.7%. Further, dimethyl 1,3,5-hexatrienylphosphonate as a by-product had been generated, and the reaction liquid contained 0.94% by mass of the compound.

Comparative Example 1

To a 1 L SUS container, 85.9 mL of acetone, 7.42 g of nickel chloride, 60.6 g of triphenylphosphine and 4.36 g of zinc were introduced, and the resulting mixture was stirred and heated under a nitrogen atmosphere for 4 hours. Thereafter, the pressure in the flask was reduced to 1.0 kPa, and acetone was removed by distillation. To a 1 L three-neck flask, 420 g of dimethyl phosphite and 21.0 g of zinc chloride were introduced, followed by stirring under a nitrogen atmosphere for 30 minutes. The resulting solution was introduced into the 1 L SUS container, the temperature was maintained at 40° C., and an acetylene gas was blown into the solution. As a result, 4.14 mol of the acetylene gas was absorbed over 510 minutes, to give dimethyl vinylphosphonate. The reaction gave a conversion rate of 91.5%, a selectivity of 62%, and a yield of 56.8%. Further, dimethyl 1,3,5-hexatrienylphosphonate as a by-product had been generated, and the reaction liquid contained 23.8% by mass of the compound.

A list of the results of Examples 1 to 3 and Comparative Example 1 described above is shown in Table 1.

TABLE 1

| | Example 1 | Example 2 | Example 3 | Comparative Example 1 |
|---|---|---|---|---|
| Starting material (Phosphorus compound) | Dimethyl phosphite | Dimethyl phosphite | Dimethyl phosphite | Dimethyl phosphite |

TABLE 1-continued

| | Example 1 | Example 2 | Example 3 | Comparative Example 1 |
|---|---|---|---|---|
| Introduced amount of phosphorus compound (g) | 420 | 420 | 420 | 420 |
| Starting material (Alkynyl compound) | Acetylene | Acetylene | Acetylene | Acetylene |
| Added amount of alkynyl compound (mol) | 3.19 | 3.72 | 3.61 | 4.14 |
| Type of catalyst | Zero-valent nickel complex | Zero-valent nickel complex | Zero-valent nickel complex | Zero-valent nickel complex |
| Added amount of catalyst (mol) | 0.0287 | 0.0382 | 0.0382 | 0.0573 |
| Type of Lewis acid | $ZnCl_2$ | $ZnCl_2$ | $ZnCl_2$ | $ZnCl_2$ |
| Added amount of Lewis acid (g) | 21.0 | 21.0 | 21.0 | 21.0 |
| Type of low-polarity additive | Toluene | Toluene | Toluene | — |
| Concentration of low-polarity additive (% by mass) | 8.1 | 7.4 | 30 | — |
| Synthesized substance (Alkenyl phosphorus compound) | Dimethyl vinylphosphonate | Dimethyl vinylphosphonate | Dimethyl vinylphosphonate | Dimethyl vinylphosphonate |
| Reaction temperature (° C.) | 25 to 28 | 25 to 27 | 25 to 27 | 40 |
| Reaction time (minutes) | 660 | 660 | 660 | 510 |
| Conversion rate (%) | 79.9 | 90.8 | 79.6 | 91.5 |
| Selectivity (%) | 80.7 | 76.3 | 77.5 | 62.0 |
| Yield (%) | 64.4 | 69.3 | 61.7 | 56.8 |
| Generated amount of dimethyl 1,3,5-hexatrienylphosphonate (%) | 0 | 2.4 | 0.94 | 23.8 |

Example 4

The same procedure as in Example 2 was carried out except that 42.0 g of tetralin was used as the low-polarity additive instead of toluene. As a result, 3.81 mol of the acetylene gas was absorbed over 720 minutes, to give dimethyl vinylphosphonate. The reaction gave a conversion rate of 91.2%, a selectivity of 75.1%, and a yield of 68.5%. Further, dimethyl 1,3,5-hexatrienylphosphonate had been generated, and the reaction liquid contained 1.8% of the compound.

Example 5

The same procedure as in Example 2 was carried out except that 42.0 g of methylnaphthalene was used as the low-polarity additive instead of toluene. As a result, 3.40 mol of the acetylene gas was absorbed over 420 minutes, to give dimethyl vinylphosphonate. The reaction gave a conversion rate of 81.3%, a selectivity of 85.3%, and a yield of 69.3%. Further, dimethyl 1,3,5-hexatrienylphosphonate had been generated, and the reaction liquid contained 2.3% of the compound.

Example 6

The same procedure as in Example 5 was carried out except that the reaction time was changed to 570 minutes. As a result, 3.89 mol of the acetylene gas was absorbed, to give dimethyl vinylphosphonate. The reaction gave a conversion rate of 91.9%, a selectivity of 73.0%, and a yield of 67.1%. Further, dimethyl 1,3,5-hexatrienylphosphonate had been generated, and the reaction liquid contained 2.2% of the compound.

A list of the results of Examples 4 to 6 described above is shown in Table 2.

TABLE 2

| | Example 4 | Example 5 | Example 6 |
|---|---|---|---|
| Starting material (Phosphorus compound) | Dimethyl phosphite | Dimethyl phosphite | Dimethyl phosphite |
| Introduced amount of phosphorus compound (g) | 420 | 420 | 420 |
| Starting material (Alkynyl compound) | Acetylene | Acetylene | Acetylene |

TABLE 2-continued

| | Example 4 | Example 5 | Example 6 |
|---|---|---|---|
| Added amount of alkynyl compound (mol) | 3.81 | 3.40 | 3.89 |
| Type of catalyst | Zero-valent nickel complex | Zero-valent nickel complex | Zero-valent nickel complex |
| Added amount of catalyst (mol %) | 1.0 | 1.0 | 1.0 |
| Type of Lewis acid | $ZnCl_2$ | $ZnCl_2$ | $ZnCl_2$ |
| Added amount of Lewis acid (g) | 21.0 | 21.0 | 21.0 |
| Type of low-polarity additive | Tetralin | Methylnaphthalene | Methylnaphthalene |
| Concentration of low-polarity additive (% by mass) | 7.4 | 7.4 | 7.4 |
| Synthesized substance (Alkenyl phosphorus compound) | Dimethyl vinylphosphonate | Dimethyl vinylphosphonate | Dimethyl vinylphosphonate |
| Reaction temperature (° C.) | 25 to 27 | 25 to 28 | 25 to 28 |
| Reaction time (minutes) | 720 | 420 | 570 |
| Conversion rate (%) | 91.2 | 81.3 | 91.9 |
| Selectivity (%) | 75.1 | 85.3 | 73.0 |
| Yield (%) | 68.5 | 69.3 | 67.1 |
| Generated amount of by-product (% by mass) | 1.8 | 2.3 | 2.2 |

The invention claimed is:

1. A method of producing an alkenyl phosphorus compound represented by the general formula (4) shown below, comprising allowing a phosphorus compound represented by the following general formula (1):

(1)

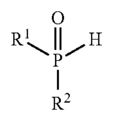

wherein, in general formula (1), each of $R^1$ and $R^2$ independently represents a substituted or unsubstituted alkyl group, a substituted or unsubstituted alkoxy group, a substituted or unsubstituted cycloalkyl group, a substituted or unsubstituted aralkyl group, a substituted or unsubstituted aryl group, or a substituted or unsubstituted aryloxy group; wherein $R^1$ and $R^2$ may be bonded with each other to form a cyclic structure, to react with an alkynyl compound represented by the following general formula (2):

(2)

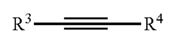

wherein, in general formula (2), each of $R^3$ and $R^4$ independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heteroaryl group, a substituted or unsubstituted alkenyl group, a substituted or unsubstituted alkoxy group, a substituted or unsubstituted aryloxy group, or a substituted or unsubstituted silyl group, in the presence of a transition metal complex, a Lewis acid and a low-polarity additive, to produce the alkenyl phosphorus compound represented by the general formula (4):

(4)

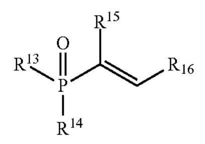

wherein, in general formula (4), the definitions of $R^{13}$ and $R^{14}$ are the same as those of $R^1$ and $R^2$ in the general formula (1), and the definitions of $R^{15}$ and $R^{16}$ are the same as those of $R^3$ and $R^4$ in the general formula (2), and wherein the Lewis acid is a metal compound.

2. The production method according to claim 1, wherein the transition metal complex is a nickel complex.

3. The production method according to claim 2, wherein the transition metal complex is a zero-valent nickel complex of nickel and a phosphine.

4. The production method according to claim 3, wherein the phosphine is a phosphine containing an aromatic substituent.

5. The production method according to claim 1, wherein the metal compound is at least one selected from the group consisting of zinc chloride, zinc bromide and iron (II) chloride.

6. The production method according to claim 1, wherein each of $R^1$ and $R^2$ in the general formula (1) independently represents a substituted or unsubstituted alkoxy group having from 1 to 10 carbon atoms, or a substituted or unsubstituted aryl group; and each of $R^{13}$ and $R^{14}$ in the general formula (4) independently represents a substituted or unsubstituted alkoxy group having from 1 to 10 carbon atoms, or a substituted or unsubstituted aryl group.

7. The production method according to claim 1, wherein both of $R^3$ and $R^4$ in the general formula (2) are hydrogen atoms, and both of $R^{15}$ and $R^{16}$ in the general formula (4) are hydrogen atoms.

8. The production method according to claim 1, wherein the reaction is carried out at a temperature of from 10 to 60° C.

9. The production method according to claim 1, wherein the low-polarity additive is at least one selected from the group consisting of an aromatic hydrocarbon, an aliphatic hydrocarbon and an alicyclic hydrocarbon.

10. The production method according to claim 1, wherein the low-polarity additive is at least one selected from the group consisting of toluene, tetralin and methylnaphthalene.

11. The production method according to claim 1, wherein the amount of the low-polarity additive added is 1% by mass or more and 70% by mass or less with respect to the total amount of the reaction system other than the alkynyl compound.

12. The production method according to claim 1, wherein the rate of generation of a by-product is 10% or less.

* * * * *